United States Patent
Huang et al.

(10) Patent No.: US 11,468,769 B2
(45) Date of Patent: Oct. 11, 2022

(54) METHOD FOR DETECTING VEHICLE QUEUE LENGTH

(71) Applicant: BEIJING BAIDU NETCOM SCIENCE AND TECHNOLOGY CO., LTD., Beijing (CN)

(72) Inventors: Xuan Huang, Beijing (CN); Fan Yang, Beijing (CN); Yongyi Sun, Beijing (CN); Chengfa Wang, Beijing (CN); Hui Yuan, Beijing (CN); Qiqi Xu, Beijing (CN)

(73) Assignee: Apollo Intelligent Connectivity (Beijing) Technology Co., Ltd., Beijing (CN)

(*) Notice: Subject to any disclaimer, the term of this patent is extended or adjusted under 35 U.S.C. 154(b) by 136 days.

(21) Appl. No.: 16/926,313

(22) Filed: Jul. 10, 2020

(65) Prior Publication Data
US 2021/0142660 A1 May 13, 2021

(30) Foreign Application Priority Data

Nov. 13, 2019 (CN) .......................... 201911105663.9

(51) Int. Cl.
G08G 1/08 (2006.01)
G08G 1/01 (2006.01)
(52) U.S. Cl.
CPC .................. G08G 1/0133 (2013.01)
(58) Field of Classification Search
CPC .......... G08G 1/0133; G08G 1/08; G08G 1/01; G08G 1/0112; G08G 1/0125;
(Continued)

(56) References Cited

U.S. PATENT DOCUMENTS

2009/0167561 A1* 7/2009 Liang ..................... G08G 1/095
340/907
2011/0043378 A1* 2/2011 Bailey ..................... G08G 1/081
340/917
(Continued)

FOREIGN PATENT DOCUMENTS

CN 103258425 A 8/2013
CN 106960571 A 7/2017
(Continued)

OTHER PUBLICATIONS

European Patent Application No. 20185636.6 extended Search and Opinion dated Jan. 18, 2021, 9 pages.
(Continued)

Primary Examiner — Hai Phan
Assistant Examiner — Anthony D Afrifa-Kyei
(74) Attorney, Agent, or Firm — Lathrop GPM LLP

(57) ABSTRACT

A method and an electronic device for detecting a vehicle queue length are disclosed. The method includes: when determining that a traffic light turns green, obtaining vehicle information of each vehicle on a lane section to be detected in a first preset time period before a time point when the traffic light turns green; determining at least one vehicle that has a static position and a static time point on the lane section to be detected; determining a first queuing vehicle and a last queuing vehicle on the lane section to be detected based on the at least one vehicle that has the static position and the static time point on the lane section to be detected; and determining a vehicle queue length on the lane section to be detected based on a position of the first queuing vehicle and a position of the last queuing vehicle.

15 Claims, 5 Drawing Sheets

(58) Field of Classification Search
CPC .. G08G 1/0145; G06F 16/29; G06K 9/00718; G06K 9/00; G06K 9/00624; G06K 9/00711; G06K 9/00724; G06K 9/00731; G06K 2209/23; H04N 7/18
See application file for complete search history.

(56) References Cited

U.S. PATENT DOCUMENTS

| | | | |
|---|---|---|---|
| 2015/0106007 A1* | 4/2015 | Matsumura | G01C 21/26 |
| | | | 701/408 |
| 2017/0206783 A1 | 7/2017 | Miller | |

FOREIGN PATENT DOCUMENTS

| | | | |
|---|---|---|---|
| CN | 107644529 A | | 1/2018 |
| CN | 109891469 A | | 6/2019 |
| DE | 102018202909 A1 | | 8/2019 |
| EP | 2557551 A1 | | 2/2013 |
| JP | 2009015817 A | | 1/2009 |
| WO | WO 2019028656 A1 | | 2/2019 |

OTHER PUBLICATIONS

Chinese Patent Application No. 201911105663.9 Office Action dated Sep. 29, 2021, 10 pages.
Chinese Patent Application No. 201911105663.9 English translation of Office Action dated Sep. 29, 2021, 10 pages.
Japanese Patent Application No. 2020-189257 Office Action dated Oct. 19, 2021, 4 pages.
Japanese Patent Application No. 2020-189257 English translation of Office Action dated Oct. 19, 2021, 4 pages.

* cited by examiner

METHOD FOR DETECTING VEHICLE QUEUE LENGTH

CROSS-REFERENCE TO RELATED APPLICATION

This application claims priority to and benefits of Chinese Patent Application Serial No. 201911105663.9, filed the State Intellectual Property Office of P. R. China on Nov. 13, 2019, the entire content of which is incorporated herein by reference.

FIELD

The present disclosure relates to a field of data processing technologies, in particular, to a field of map navigation technologies, and more particularly, to a method for detecting a vehicle queue length.

BACKGROUND

At present, in the field of intelligent transportation, for road intersections, it is necessary to calculate a vehicle queue length on each lane, such that duration of traffic lights may be determined in combination with the vehicle queue length. The current method for detecting a vehicle queue length is to arrange vehicle detectors on a road to detect an occupancy status of the lane, and then to determine a vehicle queuing status based on the occupancy status.

SUMMARY

Embodiments of the present disclosure provide a method for detecting a vehicle queue length, including: in response to determining that a traffic light turns green, obtaining vehicle information of each vehicle on a lane section to be detected in a first preset time period before a time point when the traffic light turns green, in which the vehicle information includes a position, speed and a collection time point; determining at least one vehicle that has a static position and a static time point on the lane section to be detected based on the vehicle information of each vehicle in the first preset time period; and determining a vehicle queue length on the lane section to be detected based on the at least one vehicle that has the static position and the static time point on the lane section to be detected.

Embodiments of the present disclosure provide an electronic device including at least one processor, and a memory connected in communication with the at least one processor. The memory stores an instruction executable by the at least one processor. When the instruction is executed by the at least one processor, the at least one processor may be configured to perform the method for detecting the vehicle queue length according to any embodiment of the present disclosure.

Embodiments of the present disclosure provide a non-transitory computer-readable storage medium having a computer instruction stored thereon. The computer instruction is configured to cause a computer to perform the method for detecting the vehicle queue length according to any embodiment of the present disclosure.

Other effects of the above optional implementations will be described below in combination with specific embodiments.

BRIEF DESCRIPTION OF THE DRAWINGS

The accompanying drawings are used for a better understanding of the solution and do not constitute a limitation on the present disclosure.

DETAILED DESCRIPTION

Exemplary embodiments of the present disclosure are described below with reference to the accompanying drawings, which include various details of the embodiments of the present disclosure to facilitate understanding, and should be considered as merely exemplary. Therefore, those skilled in the art should recognize that various changes and modifications may be made to the embodiments described herein without departing from the scope and spirit of the present disclosure. Also, for clarity and conciseness, descriptions of well-known functions and structures are omitted in the following description.

A method and an apparatus for detecting a vehicle queue length according to embodiments of the present disclosure will be described below with reference to the accompanying drawings.

Figure 1:
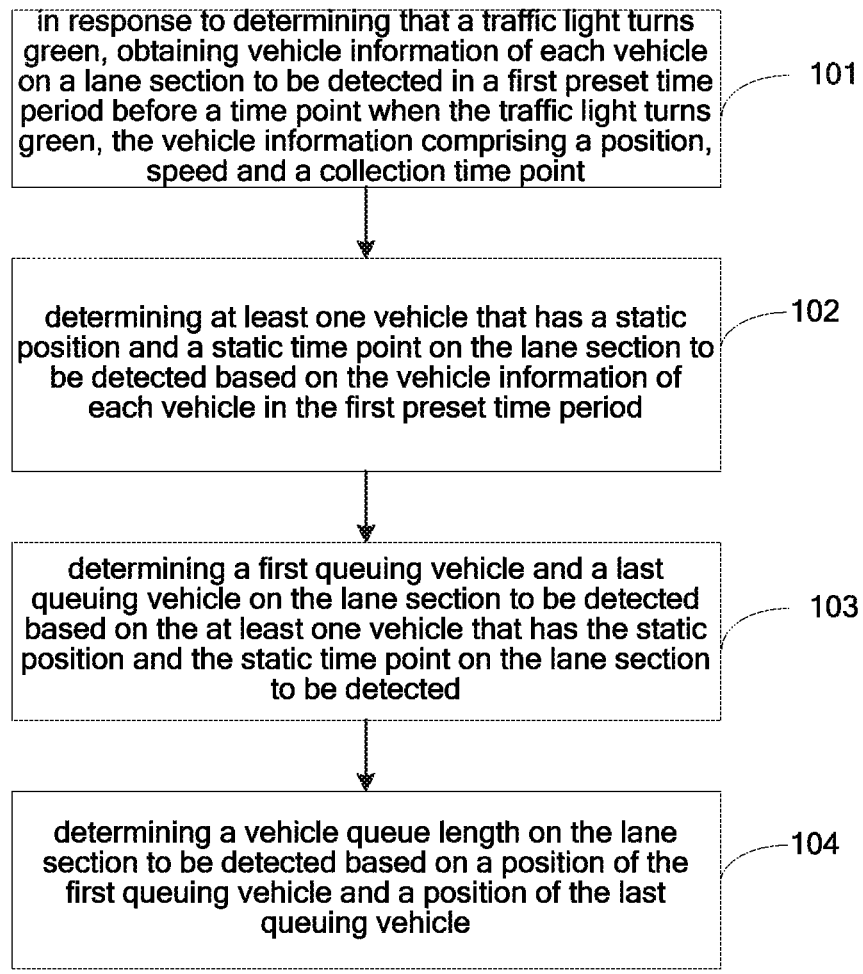
FIG. 1 is a flow chart of a method for detecting a vehicle queue length according to an embodiment of the present disclosure.

FIG. 1 is a flow chart of a method for detecting a vehicle queue length according to an embodiment of the present disclosure. It should be noted that an execution subject of the method for detecting a vehicle queue length according to the embodiment is an apparatus for detecting a vehicle queue length. The apparatus may be implemented by software and/or hardware, and may be configured in a terminal device or a server. The apparatus may be, for example, an overall control center of a road intersection, which is not limited in the embodiment. In the embodiment, the overall control center of the road intersection may be used as an example of the apparatus for detecting a vehicle queue length.

As illustrated in FIG. 1, the method for detecting a vehicle queue length may include the following.

At block 101, in response to determining that a traffic light turns green, vehicle information of each vehicle on a lane section to be detected in a first preset time period before a time point when the traffic light turns green is obtained. The vehicle information includes a position, speed and a collection time point.

In an embodiment of the present disclosure, the time point when the traffic light turns green may be obtained based on a timing length allocated to each traffic light, or obtained from a time allocation device of the traffic lights. Before the time point when the traffic light turns green, the apparatus for detecting a vehicle queue length may receive vehicle information reported by at least one vehicle within a preset distance range in real time, in which the vehicle information is reported when a speed of the at least one vehicle is less than a first speed threshold. The vehicle information reported includes ego vehicle information of the reporting vehicle, or includes the ego vehicle information of the reporting vehicle and surrounding vehicle information of the reporting vehicle. The lane section to be detected is within the preset distance range. The apparatus determines the vehicle information of each vehicle on the lane section to be detected based on the vehicle information reported by the at least one vehicle within the preset distance range.

In detail, in an embodiment of the present application, a roadside device is provided on each road side of the overall control center of the road intersection. When a speed of a vehicle on the road is less than the first speed threshold, the vehicle reports ego vehicle information to a roadside device within a certain distance range. Since some vehicles may also detect vehicle information of surrounding vehicles, they may report the vehicle information of the surrounding vehicles while reporting ego vehicle information, thereby ensuring that vehicle information of some vehicles that have no reporting function may be reported to the roadside device via surrounding vehicles. The roadside device reports the vehicle information received to the overall control center of the road intersection in real time or periodically.

Since vehicle information of one vehicle may be reported by itself or surrounding vehicles, the overall control center may, after receiving the vehicle information, perform duplicate vehicle information based on the position in the vehicle information to ensure that each vehicle has only one piece of vehicle information at each time point. A lane where each vehicle is located is determined based on the vehicle information of each vehicle, and then it is determined whether each vehicle is within a control range of the overall control center based on the lane. If not, vehicle information of a vehicle that is out of the control range of the overall control center is transmitted to an appropriate overall control center. The vehicle information of each vehicle on a lane section is determined based on the lane. The lane section refers to a lane section controlled by the overall control center, for example, a lane section between two sets of traffic lights.

It should be noted that, in the present disclosure, since a vehicle may report vehicle information in real time or periodically, each vehicle may have a plurality of pieces of vehicle information within the first preset time period. The first preset time period may be, for example, 6 s.

At block 102, at least one vehicle that has a static position and a static time point on the lane section to be detected is determined based on the vehicle information of each vehicle in the first preset time period.

In an embodiment of the present disclosure, the process for the apparatus for detecting a vehicle queue length to perform the action at block 102 may be as follows. For each vehicle on the lane section to be detected, it is determined whether the vehicle has a static position and a static time point on the lane section to be detected based on the vehicle information of the vehicle in the first preset time period. In detail, for each vehicle on the lane section to be detected, it is determined whether first vehicle information including a speed of zero exists in respective pieces of vehicle information of the vehicle in the first preset time period; and in response to an existence of the first vehicle information, a position in the first vehicle information is determined as the static position of the vehicle, and a time point in the first vehicle information is determined as the static time point of the vehicle.

At block 103, a first queuing vehicle and a last queuing vehicle on the lane section to be detected are determined based on the at least one vehicle that has the static position and the static time point on the lane section to be detected.

In an embodiment of the present disclosure, the apparatus for detecting a vehicle queue length may order the at least one vehicle that has the static position and the static time point on the lane section to be detected based on a distance between the static position and a parking line to obtain a vehicle queuing list. Consequently, the first queuing vehicle on the lane section to be detected that is closest to the parking line and the last queuing vehicle on the lane section to be detected that is farthest from the parking line are determined.

At block 104, a vehicle queue length on the lane section to be detected is determined based on a position of the first queuing vehicle and a position of the last queuing vehicle.

In an embodiment of the present disclosure, the apparatus for detecting a vehicle queue length may determine a distance between the position of the last queuing vehicle and the position of the first queuing vehicle as the vehicle queue length on the lane section to be detected.

Further, in an embodiment of the present disclosure, after determining the vehicle queue length on the lane section to be detected, timing for the traffic light corresponding to the lane section to be detected may performed based on the vehicle queue length on the lane section to be detected. The traffic light corresponding to the lane section to be detected specifically refers to the traffic light located outside the parking line of the lane section to be detected.

With the method for detecting a vehicle queue length according to an embodiment of the present disclosure, in response to determining that the traffic light turns green, the vehicle information of each vehicle on the lane section to be detected in the first preset time period before the time point when the traffic light turns green is obtained, in which the vehicle information includes the position, the speed and the collection time point, the at least one vehicle that has the static position and the static time point on the lane section to be detected is determined based on the vehicle information of each vehicle in the first preset time period, the first queuing vehicle and the last queuing vehicle on the lane section to be detected are determined based on the at least one vehicle that has the static position and the static time point on the lane section to be detected, and the vehicle queue length on the lane section to be detected is determined based on the position of the first queuing vehicle and the position of the last queuing vehicle. Consequently, the vehicle queue length may be determined based on the vehicle information of each vehicle on the lane section to be detected in the first preset time period before the time point when the traffic light turns green with high accuracy, high real-time performance and low cost, without providing vehicle detectors.

Figure 2:
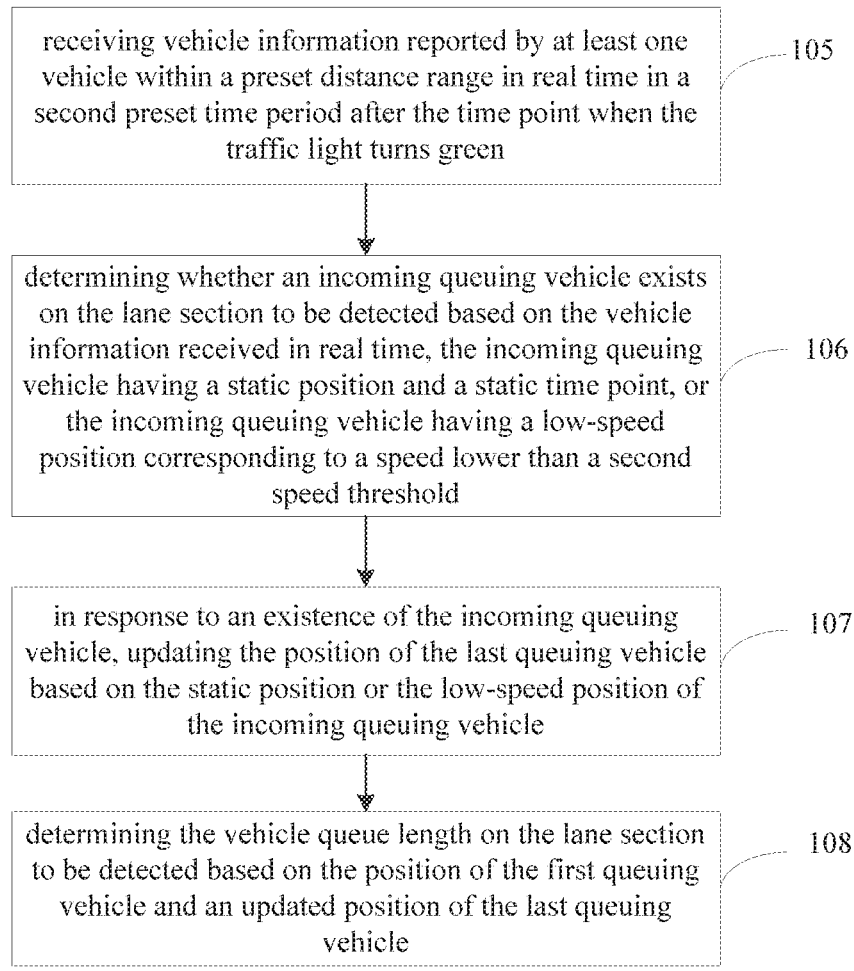
FIG. 2 is a flow chart of a method for detecting a vehicle queue length according to an embodiment of the present disclosure.

FIG. 2 is a flow chart of a method for detecting a vehicle queue length according to an embodiment of the present disclosure. As illustrated in FIG. 2, on the basis of the embodiment illustrated in FIG. 1, the method may further include the following.

At block 105, vehicle information reported by at least one vehicle within a preset distance range is received in real time within a second preset time period after the time point when the traffic light turns green.

The second preset time period may be, for example, 3 s.

At block 106, it is determined whether an incoming queuing vehicle exists on the lane section to be detected based on the vehicle information received in real time. The incoming queuing vehicle has a static position and a static time point, or the incoming queuing vehicle has a low-speed position corresponding to a speed lower than a second speed threshold.

In an embodiment of the present disclosure, in response to the time point when the traffic light turns green, a plurality of vehicles may be waiting in line, and thus it is difficult for all of the vehicles to leave in a short period of time. For example, if there are 10 vehicles in queue, it is difficult for the 10 vehicles to leave in 1 s. In addition, other vehicles may enter the lane section to be detected for queuing as time passes by. Consequently, the incoming queuing vehicle may be determined based on the vehicle information received in real time after the time point when the traffic light turns green, and the vehicle queue length is updated to obtain the maximum vehicle queue length, thereby improving the accuracy of detecting the vehicle queue length and the accuracy of time allocation to the traffic light.

At block 107, in response to an existence of the incoming queuing vehicle, the position of the last queuing vehicle is updated based on the static position or the low-speed position of the incoming queuing vehicle.

In an embodiment of the present disclosure, if the number of the incoming queuing vehicle is one, the position of the last queuing vehicle is updated to the static position or the low-speed position of the incoming queuing vehicle. If more than one incoming queuing vehicles exist, an incoming queuing vehicle with a static position or a low-speed position farthest from the parking line may be determined, and then the position of the last queuing vehicle may be updated to the static position or the low-speed position of the incoming queuing vehicle farthest from the parking line.

At block 108, the vehicle queue length on the lane section to be detected is determined based on the position of the first queuing vehicle and an updated position of the last queuing vehicle.

With the method for detecting a vehicle queue length according to embodiments of the present disclosure, the vehicle information reported by the at least one vehicle within the preset distance range is received in real time within the second preset time period after the time point when the traffic light turns green, it is determined whether the incoming queuing vehicle exists on the lane section to be detected based on the vehicle information received in real time, in which the incoming queuing vehicle has the static position and the static time point, or the incoming queuing vehicle has the low-speed position corresponding to the speed lower than the second speed threshold, in response to an existence of the incoming queuing vehicle, the position of the last queuing vehicle is updated based on the static position or the low-speed position of the incoming queuing vehicle, the vehicle queue length on the lane section to be detected is determined based on the position of the first queuing vehicle and the updated position of the last queuing vehicle, such that the maximum vehicle queue length may be obtained. Consequently, the accuracy of detecting the vehicle queue length and the accuracy of time allocation to the traffic light may be improved. In order to implement the above embodiments, embodiments of the present disclosure also provide an apparatus for detecting a vehicle queue length.

Figure 3:
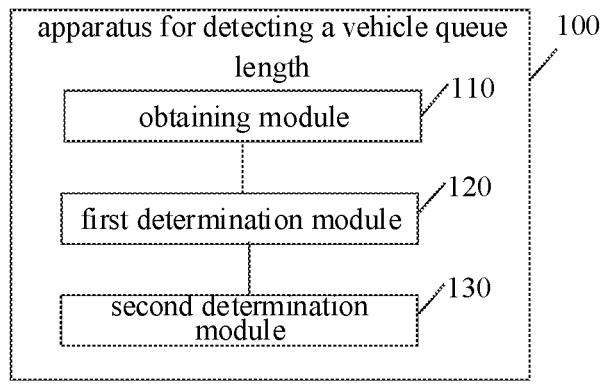
FIG. 3 is a block diagram illustrating an apparatus for detecting a vehicle queue length according to an embodiment of the present disclosure.

FIG. 3 is a block diagram illustrating an apparatus for detecting a vehicle queue length according to an embodiment of the present application. As illustrated in FIG. 3, the apparatus 100 for detecting a vehicle queue length includes an obtaining module 110, a first determination module 120 and a second determination module 130.

The obtaining module 110 is configured to, in response to determining that a traffic light turns green, obtain vehicle information of each vehicle on a lane section to be detected in a first preset time period before a time point when the traffic light turns green. The vehicle information includes a position, speed and a collection time point.

The first determination module 120 is configured to determine at least one vehicle that has a static position and a static time point on the lane section to be detected based on the vehicle information of each vehicle in the first preset time period.

The second determination module 130 is configured to determine a first queuing vehicle and a last queuing vehicle on the lane section to be detected based on the at least one vehicle that has the static position and the static time point on the lane section to be detected.

The second determination module 130 is further configured to determine a vehicle queue length on the lane section to be detected based on a position of the first queuing vehicle and a position of the last queuing vehicle.

Figure 4:
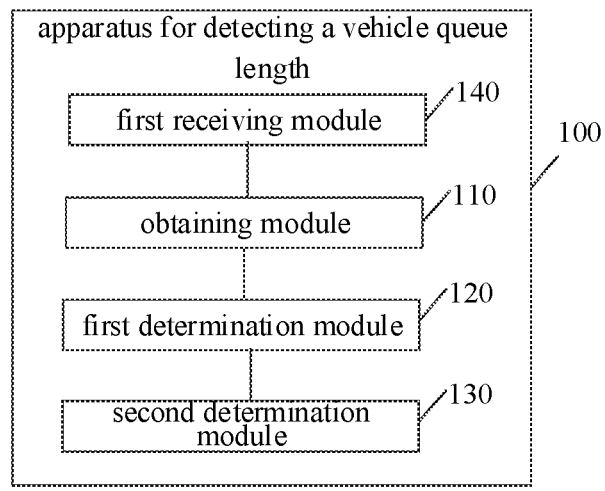
FIG. 4 is a block diagram illustrating an apparatus for detecting a vehicle queue length according to an embodiment of the present disclosure.

In an embodiment of the present disclosure, with reference to FIG. 4, the apparatus further includes a first receiving module 140.

The first receiving module 140 is configured to receive vehicle information reported by at least one vehicle within a preset distance range in real time before the time point when the traffic light turns green. The vehicle information is reported when a speed of the at least one vehicle is less than a first speed threshold. The vehicle information reported includes ego vehicle information of each vehicle, or includes the ego vehicle information of each vehicle and surrounding vehicle information of each vehicle. The lane section to be detected is within the preset distance range.

The second determination module 130 is further configured to determine the vehicle information of each vehicle on the lane section to be detected based on the vehicle information reported by the at least one vehicle within the preset distance range.

In an embodiment of the present disclosure, the first determination module 120 is configured to: for each vehicle on the lane section to be detected, determine whether first vehicle information including a speed of zero exists in respective pieces of vehicle information of the vehicle in the first preset time period; and in response to an existence of the first vehicle information, determine a position in the first vehicle information as the static position of the vehicle, and determine a time point in the first vehicle information as the static time point of the vehicle.

Figure 5:
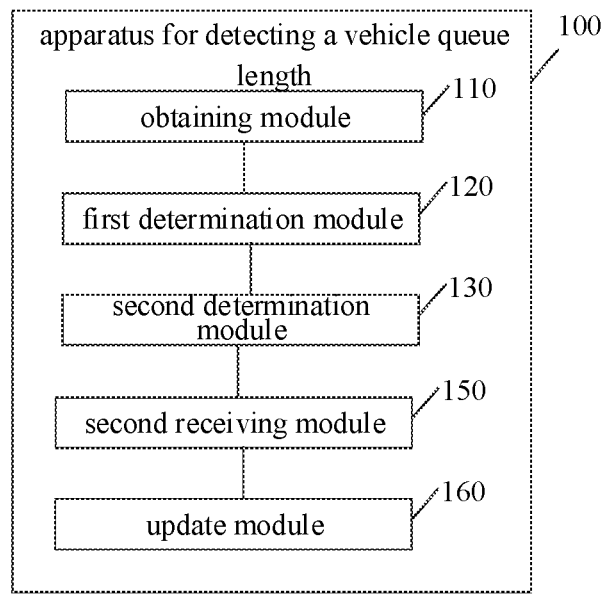
FIG. 5 is a block diagram illustrating an apparatus for detecting a vehicle queue length according to an embodiment of the present disclosure.

In an embodiment of the present disclosure, with reference to FIG. 5, the apparatus further includes a second receiving module 150 and an update module 160.

The second receiving module 150 is configured to receive vehicle information reported by at least one vehicle within a preset distance range in real time in a second preset time period after the time point when the traffic light turns green.

The first determination module 160 is configured to determine whether an incoming queuing vehicle exists on the lane section to be detected based on the vehicle information received in real time. The incoming queuing vehicle has a static position and a static time point, or the incoming queuing vehicle has a low-speed position corresponding to a speed lower than a second speed threshold.

The update module 160 is configured to, in response to an existence of the incoming queuing vehicle, update the position of the last queuing vehicle based on the static position or the low-speed position of the incoming queuing vehicle.

The second determination module 130 is configured to determine the vehicle queue length on the lane section to be detected based on the position of the first queuing vehicle and an updated position of the last queuing vehicle.

Figure 6:
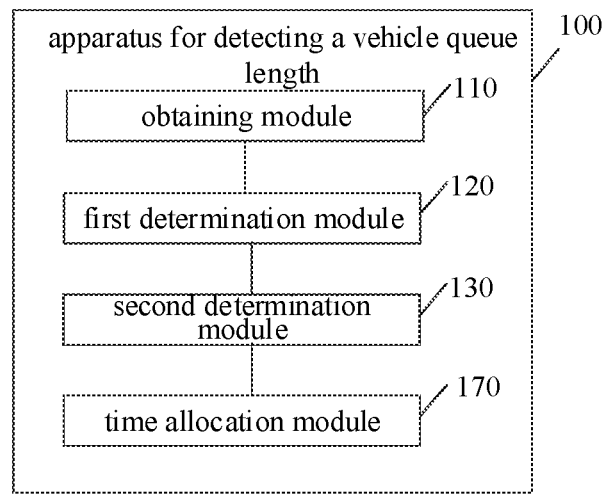
FIG. 6 is a block diagram illustrating an apparatus for detecting a vehicle queue length according to an embodiment of the present disclosure.

In an embodiment of the present disclosure, with reference to FIG. 6, the apparatus further includes a time allocation module 170. The time allocation module 170 is configured to allocate time for the traffic light corresponding to the lane section to be detected based on the vehicle queue length on the lane section to be detected.

It should be noted that the foregoing explanation of the method for detecting a vehicle queue length is also applicable to the apparatus for detecting a vehicle queue length according to the above embodiments, and thus details will not be described here.

With the apparatus for detecting a vehicle queue length according to embodiments of the present disclosure, in response to determining that the traffic light turns green, the vehicle information of each vehicle on the lane section to be detected in the first preset time period before the time point when the traffic light turns green is obtained, in which the vehicle information includes the position, the speed and the collection time point, the at least one vehicle that has the static position and the static time point on the lane section to be detected is determined based on the vehicle information of each vehicle in the first preset time period, the first queuing vehicle and the last queuing vehicle on the lane section to be detected are determined based on the at least one vehicle that has the static position and the static time point on the lane section to be detected, and the vehicle queue length on the lane section to be detected is determined based on the position of the first queuing vehicle and the position of the last queuing vehicle. Consequently, the vehicle queue length may be determined based on the vehicle information of each vehicle on the lane section to be detected in the first preset time period before the time point when the traffic light turns green with high accuracy, high real-time performance and low cost, without providing vehicle detectors.

According to embodiments of the present disclosure, an electronic device and a readable storage medium are provided.

Figure 7:
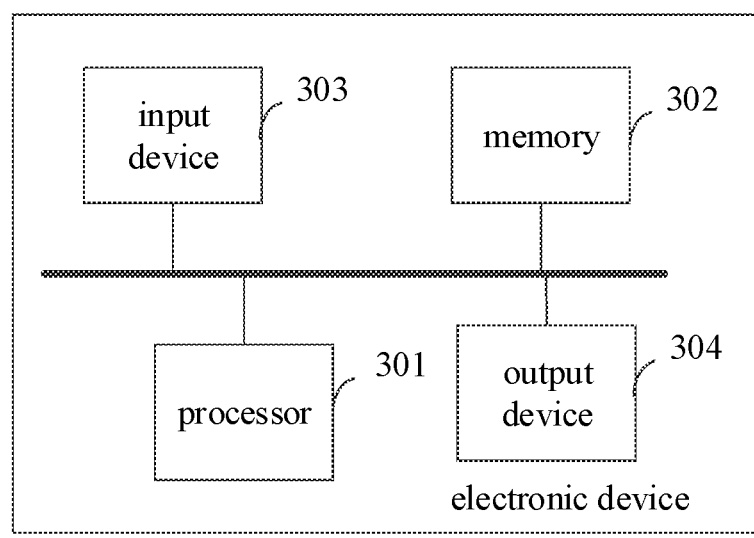
FIG. 7 is a block diagram of an electronic device configured to implement a method for detecting a vehicle queue length according to an embodiment of the present disclosure.

FIG. 7 is a block diagram of an electronic device for implementing a method for detecting a vehicle queue length according to an embodiment of the present disclosure. The electronic device is intended to represent various forms of digital computers, such as a laptop computer, a desktop computer, a workbench, a personal digital assistant, a server, a blade server, a mainframe computer and other suitable computers. The electronic device may also represent various forms of mobile devices, such as a personal digital processor, a cellular phone, a smart phone, a wearable device and other similar computing devices. Components shown herein, their connections and relationships as well as their functions are merely examples, and are not intended to limit the implementation of the present disclosure described and/or required herein.

As illustrated in FIG. 7, the electronic device includes: one or more processors 301, a memory 302, and interfaces for connecting various components, including a high-speed interface and a low-speed interface. The components are interconnected by different buses and may be mounted on a common motherboard or otherwise installed as required. The processor may process instructions executed within the electronic device, including instructions stored in or on the memory to display graphical information of the GUI (Graphical User Interface) on an external input/output device (such as a display device coupled to the interface). In other embodiments, when necessary, multiple processors and/or multiple buses may be used with multiple memories. Similarly, multiple electronic devices may be connected, each providing some of the necessary operations (for example, as a server array, a group of blade servers, or a multiprocessor system). One processor 301 is taken as an example in FIG. 7.

The memory 302 is a non-transitory computer-readable storage medium provided by the present disclosure. The memory stores instructions executable by at least one processor, so that the at least one processor executes the method for detecting a vehicle queue length provided by the present disclosure. The non-transitory computer-readable storage medium according to the present disclosure stores computer instructions, which are configured to make the computer execute the method for detecting a vehicle queue length provided by the present disclosure.

As a non-transitory computer-readable storage medium, the memory 302 may be configured to store non-transitory software programs, non-transitory computer executable programs and modules, such as program instructions/modules (for example, the obtaining module 110, the first determination module 120 and the second determination module 130 illustrated in FIG. 3, the first receiving module 140 illustrated in FIG. 4, the second receiving module 150 and the update module 160 illustrated in FIG. 5, and the time allocation module 170 illustrated in FIG. 6) corresponding to the method for detecting a vehicle queue length according to the embodiments of the present disclosure. The processor 301 executes various functional applications and performs data processing of the server by running non-transitory software programs, instructions and modules stored in the memory 302, that is, the method for detecting a vehicle queue length according to the foregoing method embodiments is implemented.

The memory 302 may include a program storage area and a data storage area, where the program storage area may store an operating system and applications required for at least one function; and the data storage area may store data created according to the use of the electronic device that implements the method for detecting a vehicle queue length according to the embodiments of the present disclosure, and the like. In addition, the memory 302 may include a high-speed random access memory, and may further include a non-transitory memory, such as at least one magnetic disk memory, a flash memory device, or other non-transitory solid-state memories. In some embodiments, the memory 302 may optionally include memories remotely disposed with respect to the processor 301, and these remote memories may be connected to the electronic device configured to implement the method for detecting a vehicle queue length according to the embodiments of the present disclosure, through a network. Examples of the network include, but are not limited to, the Internet, an intranet, a local area network, a mobile communication network, and combinations thereof.

The electronic device configured to implement the method for detecting a vehicle queue length according to the embodiments of the present disclosure may further include an input device 303 and an output device 304. The processor 301, the memory 302, the input device 303 and the output device 304 may be connected through a bus or in other manners. FIG. 7 is illustrated by establishing the connection through a bus.

The input device 303 may receive input numeric or character information, and generate key signal inputs related to user settings and function control of the electronic device configured to implement the method for detecting a vehicle queue length according to the embodiments of the present disclosure, such as a touch screen, a keypad, a mouse, a trackpad, a touchpad, a pointing stick, one or more mouse buttons, trackballs, joysticks and other input devices. The output device 304 may include a display device, an auxiliary lighting device (for example, an LED), a haptic feedback device (for example, a vibration motor), and so on. The display device may include, but is not limited to, a liquid crystal display (LCD), a light emitting diode (LED) display and a plasma display. In some embodiments, the display device may be a touch screen.

Various implementations of systems and technologies described herein may be implemented in digital electronic circuit systems, integrated circuit systems, application-specific ASICs (application-specific integrated circuits), computer hardware, firmware, software, and/or combinations thereof. These various implementations may include: being implemented in one or more computer programs that are executable and/or interpreted on a programmable system including at least one programmable processor. The programmable processor may be a dedicated or general-purpose programmable processor that may receive data and instructions from a storage system, at least one input device and at least one output device, and transmit data and instructions to the storage system, the at least one input device and the at least one output device.

These computing programs (also known as programs, software, software applications, or codes) include machine instructions of a programmable processor, and may implement these computing procedures by utilizing high-level procedures and/or object-oriented programming languages, and/or assembly/machine languages. As used herein, terms "machine-readable medium" and "computer-readable medium" refer to any computer program product, device and/or apparatus configured to provide machine instructions and/or data to a programmable processor, such as a magnetic disk, an optical disk, a memory and a programmable logic device (PLD), and includes machine-readable media that receive machine instructions as machine-readable signals. The term "machine-readable signals" refers to any signal used to provide machine instructions and/or data to a programmable processor.

In order to provide interactions with the user, the systems and technologies described herein may be implemented on a computer having: a display device (for example, a cathode ray tube (CRT) or a liquid crystal display (LCD) monitor) for displaying information to the user; and a keyboard and a pointing device (such as a mouse or trackball) through which the user may provide input to the computer. Other kinds of devices may also be used to provide interactions with the user. For example, the feedback provided to the user may be any form of sensory feedback (e.g., visual feedback, auditory feedback or haptic feedback); and input from the user may be received in any form (including acoustic input, voice input or tactile input).

The systems and technologies described herein may be implemented in a computing system that includes back-end components (for example, as a data server), a computing system that includes middleware components (for example, an application server), or a computing system that includes front-end components (for example, a user computer with a graphical user interface or a web browser, through which the user may interact with the implementation of the systems and technologies described herein), or a computing system including any combination of the back-end components, the middleware components or the front-end components. The components of the system may be interconnected by digital data communication (e.g., a communication network) in any form or medium. Examples of the communication network include a local area network (LAN), a wide area network (WAN), and the Internet.

Computer systems may include a client and a server. The client and server are generally remote from each other and typically interact through the communication network. A client-server relationship is generated by computer programs running on respective computers and having a client-server relationship with each other.

Figure 8:
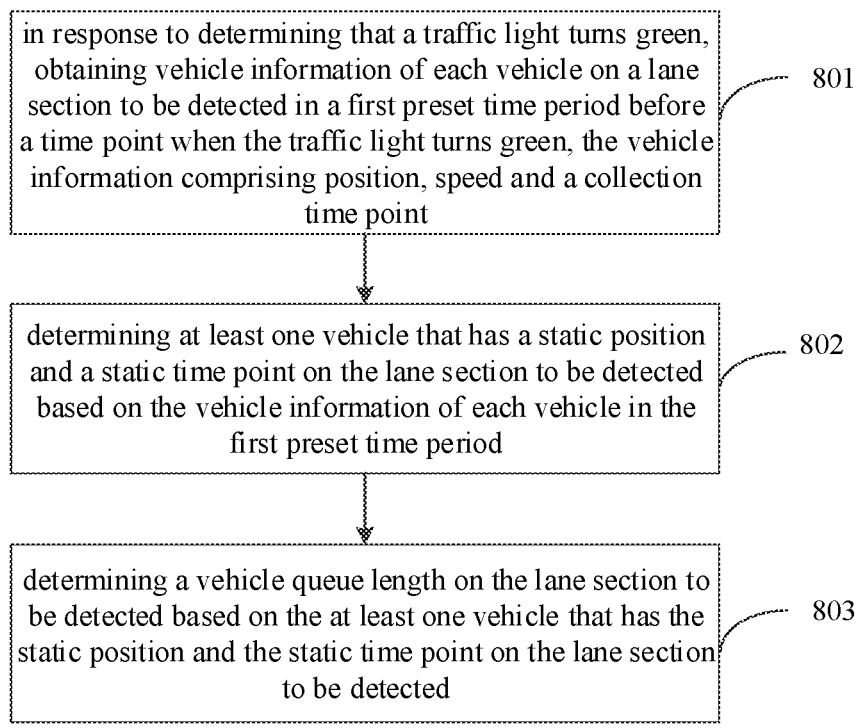
FIG. 8 is a flow chart of a method for detecting a vehicle queue length according to an embodiment of the present disclosure.

FIG. 8 is a flow chart of a method for detecting a vehicle queue length according to an embodiment of the present disclosure. It should be noted that an execution subject of the method for detecting a vehicle queue length according to the embodiment is an apparatus for detecting a vehicle queue length. The apparatus may be implemented by software and/or hardware, and may be configured in a terminal device or a server. The apparatus may be, for example, an overall control center of a road intersection, which is not limited in the embodiment. In the embodiment, the overall control center of the road intersection may be used as an example of the apparatus for detecting a vehicle queue length.

As illustrated in FIG. 8, the method for detecting a vehicle queue length may include the following.

At block 801, in response to determining that a traffic light turns green, vehicle information of each vehicle on a lane section to be detected in a first preset time period before a time point when the traffic light turns green is obtained. The vehicle information includes a position, speed and a collection time point.

In an embodiment of the present disclosure, the time point when the traffic light turns green may be obtained based on a timing length allocated to each traffic light, or obtained from a time allocation device of the traffic lights. Before the time point when the traffic light turns green, the apparatus for detecting a vehicle queue length may receive vehicle information reported by at least one vehicle within a preset distance range in real time, in which the vehicle information is reported when a speed of the at least one vehicle is less than a first speed threshold. The vehicle information reported includes ego vehicle information of the reporting vehicle, or includes the ego vehicle information of the reporting vehicle and surrounding vehicle information of the reporting vehicle. The lane section to be detected is within the preset distance range. The apparatus determines the vehicle information of each vehicle on the lane section to be detected based on the vehicle information reported by the at least one vehicle within the preset distance range.

At block 802, at least one vehicle that has a static position and a static time point on the lane section to be detected is determined based on the vehicle information of each vehicle in the first preset time period.

In an embodiment of the present disclosure, the process for the apparatus for detecting a vehicle queue length to perform the action at block 802 may be as follows. For each vehicle on the lane section to be detected, it is determined whether the vehicle has a static position and a static time point on the lane section to be detected based on the vehicle information of the vehicle in the first preset time period. In detail, for each vehicle on the lane section to be detected, it is determined whether first vehicle information including a speed of zero exists in respective pieces of vehicle information of the vehicle in the first preset time period; and in response to an existence of the first vehicle information, a position in the first vehicle information is determined as the static position of the vehicle, and a time point in the first vehicle information is determined as the static time point of the vehicle.

At block 803, a vehicle queue length on the lane section to be detected is determined based on the at least one vehicle that has the static position and the static time point on the lane section to be detected.

In an embodiment of the present disclosure, the process for the apparatus for detecting a vehicle queue length to perform the action at block 803 may include: determining a first queuing vehicle and a last queuing vehicle on the lane section to be detected based on the at least one vehicle that has the static position and the static time point on the lane section to be detected; and determining the vehicle queue length on the lane section to be detected based on a position of the first queuing vehicle and a position of the last queuing vehicle.

With the method for detecting a vehicle queue length according to embodiments of the present disclosure, in response to determining that the traffic light turns green, the vehicle information of each vehicle on the lane section to be detected in the first preset time period before the time point when the traffic light turns green is obtained, in which the vehicle information includes a position, speed and the collection time point, the at least one vehicle that has the static position and the static time point on the lane section to be detected is determined based on the vehicle information of each vehicle in the first preset time period, and the vehicle queue length on the lane section to be detected is determined based on the at least one vehicle that has the static position and the static time point on the lane section to be detected. Consequently, the vehicle queue length may be determined based on the vehicle information of each vehicle on the lane section to be detected in the first preset time period before the time point when the traffic light turns green with high accuracy, high real-time performance and low cost, without providing vehicle detectors.

It should be noted that the foregoing explanation of the above method for detecting a vehicle queue length is also applicable to the method for detecting a vehicle queue length according to this embodiment. Related descriptions may be found in relevant sections, and thus repeated descriptions are omitted herein.

It should be understood that various forms of processes shown above may be reordered, added or deleted. For example, the actions at blocks described in the present disclosure may be executed in parallel, sequentially, or in different orders. As long as the desired results of the technical solution disclosed in the present disclosure may be achieved, there is no limitation herein.

The foregoing specific implementations do not constitute a limit on the protection scope of the present disclosure. It should be understood by those skilled in the art that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for detecting a vehicle queue length, comprising:

in response to determining that a traffic light turns green, obtaining vehicle information of each vehicle on a lane section to be detected in a first preset time period before a time point when the traffic light turns green, the vehicle information comprising a position, speed and a collection time point;

determining at least one vehicle that has a static position and a static time point on the lane section to be detected based on the vehicle information of each vehicle in the first preset time period; and determining a vehicle queue length on the lane section to be detected based on the at least one vehicle that has the static position and the static time point on the lane section to be detected;

wherein, the method further comprising:

receiving vehicle information reported by at least one vehicle within a preset distance range in real time in a second preset time period after the time point when the traffic light turns green;

determining whether an incoming queuing vehicle exists on the lane section to be detected based on the vehicle information received in real time, the incoming queuing vehicle having a static position and a static time point, or the incoming queuing vehicle having a low-speed position corresponding to a speed lower than a second speed threshold;

in response to an existence of the incoming queuing vehicle, updating the position of the last queuing vehicle based on the static position or the low-speed position of the incoming queuing vehicle; and determining the vehicle queue length on the lane section to be detected based on the position of the first queuing vehicle and an updated position of the last queuing vehicle.

2. The method of claim 1, wherein determining the vehicle queue length on the lane section to be detected based on the at least one vehicle that has the static position and the static time point on the lane section to be detected comprises:

determining a first queuing vehicle and a last queuing vehicle on the lane section to be detected based on the at least one vehicle that has the static position and the static time point on the lane section to be detected; and determining the vehicle queue length on the lane section to be detected based on a position of the first queuing vehicle and a position of the last queuing vehicle.

3. The method of claim 1, further comprising:

before the time point when the traffic light turns green, receiving vehicle information reported by at least one vehicle within a preset distance range in real time, the vehicle information being reported when a speed of the at least one vehicle is less than a first speed threshold, the vehicle information reported comprising ego vehicle information of each of the at least one vehicle, or comprising the ego vehicle information of each of the at least one vehicle and surrounding vehicle information of each of the at least one vehicle, and the lane section to be detected being within the preset distance range; and determining the vehicle information of each vehicle on the lane section to be detected based on the vehicle information reported by the at least one vehicle within the preset distance range.

4. The method of claim 1, wherein determining the at least one vehicle that has the static position and the static time point on the lane section to be detected based on the vehicle information of each vehicle in the first preset time period comprises:

for each vehicle on the lane section to be detected, determining whether first vehicle information comprising a speed of zero exists in respective pieces of vehicle information of the vehicle in the first preset time period; and in response to an existence of the first vehicle information, determining a position in the first vehicle information as the static position of the vehicle, and determining a time point in the first vehicle information as the static time point of the vehicle.

5. The method of claim 1, further comprising:
allocating time for the traffic light corresponding to the lane section to be detected based on the vehicle queue length on the lane section to be detected.

6. An electronic device, comprising:
at least one processor; and
a memory connected in communication with the at least one processor; wherein,
the memory stores an instruction executable by the at least one processor, and when the instruction is executed by the at least one processor, the at least one processor is configured to perform a method for detecting a vehicle queue length comprising:
in response to determining that a traffic light turns green, obtaining vehicle information of each vehicle on a lane section to be detected in a first preset time period before a time point when the traffic light turns green, the vehicle information comprising a position, speed and a collection time point;
determining at least one vehicle that has a static position and a static time point on the lane section to be detected based on the vehicle information of each vehicle in the first preset time period; and
determining a vehicle queue length on the lane section to be detected based on the at least one vehicle that has the static position and the static time point on the lane section to be detected;
wherein, the method further comprising:
receiving vehicle information reported by at least one vehicle within a preset distance range in real time in a second preset time period after the time point when the traffic light turns green;
determining whether an incoming queuing vehicle exists on the lane section to be detected based on the vehicle information received in real time, the incoming queuing vehicle having a static position and a static time point, or the incoming queuing vehicle having a low-speed position corresponding to a speed lower than a second speed threshold;
in response to an existence of the incoming queuing vehicle, updating the position of the last queuing vehicle based on the static position or the low-speed position of the incoming queuing vehicle; and
determining the vehicle queue length on the lane section to be detected based on the position of the first queuing vehicle and an updated position of the last queuing vehicle.

7. The electronic device of claim 6, wherein determining the vehicle queue length on the lane section to be detected based on the at least one vehicle that has the static position and the static time point on the lane section to be detected comprises:
determining a first queuing vehicle and a last queuing vehicle on the lane section to be detected based on the at least one vehicle that has the static position and the static time point on the lane section to be detected; and
determining the vehicle queue length on the lane section to be detected based on a position of the first queuing vehicle and a position of the last queuing vehicle.

8. The electronic device of claim 6, wherein the method further comprises:
before the time point when the traffic light turns green, receiving vehicle information reported by at least one vehicle within a preset distance range in real time, the vehicle information being reported when a speed of the at least one vehicle is less than a first speed threshold, the vehicle information reported comprising ego vehicle information of each of the at least one vehicle, or comprising the ego vehicle information of each of the at least one vehicle and surrounding vehicle information of each of the at least one vehicle, and the lane section to be detected being within the preset distance range; and
determining the vehicle information of each vehicle on the lane section to be detected based on the vehicle information reported by the at least one vehicle within the preset distance range.

9. The electronic device of claim 6, wherein determining the at least one vehicle that has the static position and the static time point on the lane section to be detected based on the vehicle information of each vehicle in the first preset time period comprises:
for each vehicle on the lane section to be detected, determining whether first vehicle information comprising a speed of zero exists in respective pieces of vehicle information of the vehicle in the first preset time period; and
in response to an existence of the first vehicle information, determining a position in the first vehicle information as the static position of the vehicle, and determining a time point in the first vehicle information as the static time point of the vehicle.

10. The electronic device of claim 6, wherein the method further comprises:
allocating time for the traffic light corresponding to the lane section to be detected based on the vehicle queue length on the lane section to be detected.

11. A non-transitory computer-readable storage medium having a computer instruction stored thereon, wherein the computer instruction is configured to cause a computer to perform a method for detecting a vehicle queue length comprising:
in response to determining that a traffic light turns green, obtaining vehicle information of each vehicle on a lane section to be detected in a first preset time period before a time point when the traffic light turns green, the vehicle information comprising a position, speed and a collection time point;
determining at least one vehicle that has a static position and a static time point on the lane section to be detected based on the vehicle information of each vehicle in the first preset time period; and
determining a vehicle queue length on the lane section to be detected based on the at least one vehicle that has the static position and the static time point on the lane section to be detected;
wherein, the method further comprising:
receiving vehicle information reported by at least one vehicle within a preset distance range in real time in a second preset time period after the time point when the traffic light turns green;
determining whether an incoming queuing vehicle exists on the lane section to be detected based on the vehicle information received in real time, the incoming queuing vehicle having a static position and a static time point, or the incoming queuing vehicle having a low-speed position corresponding to a speed lower than a second speed threshold;

in response to an existence of the incoming queuing vehicle, updating the position of the last queuing vehicle based on the static position or the low-speed position of the incoming queuing vehicle; and determining the vehicle queue length on the lane section to be detected based on the position of the first queuing vehicle and an updated position of the last queuing vehicle.

12. The storage medium of claim 11, wherein determining the vehicle queue length on the lane section to be detected based on the at least one vehicle that has the static position and the static time point on the lane section to be detected comprises:

determining a first queuing vehicle and a last queuing vehicle on the lane section to be detected based on the at least one vehicle that has the static position and the static time point on the lane section to be detected; and determining the vehicle queue length on the lane section to be detected based on a position of the first queuing vehicle and a position of the last queuing vehicle.

13. The storage medium of claim 11, wherein the method further comprises:

before the time point when the traffic light turns green, receiving vehicle information reported by at least one vehicle within a preset distance range in real time, the vehicle information being reported when a speed of the at least one vehicle is less than a first speed threshold, the vehicle information reported comprising ego vehicle information of each of the at least one vehicle, or comprising the ego vehicle information of each of the at least one vehicle and surrounding vehicle information of each of the at least one vehicle, and the lane section to be detected being within the preset distance range; and determining the vehicle information of each vehicle on the lane section to be detected based on the vehicle information reported by the at least one vehicle within the preset distance range.

14. The storage medium of claim 11, wherein determining the at least one vehicle that has the static position and the static time point on the lane section to be detected based on the vehicle information of each vehicle in the first preset time period comprises:

for each vehicle on the lane section to be detected, determining whether first vehicle information comprising a speed of zero exists in respective pieces of vehicle information of the vehicle in the first preset time period; and in response to an existence of the first vehicle information, determining a position in the first vehicle information as the static position of the vehicle, and determining a time point in the first vehicle information as the static time point of the vehicle.

15. The storage medium of claim 11, wherein the method further comprises:

allocating time for the traffic light corresponding to the lane section to be detected based on the vehicle queue length on the lane section to be detected.

\* \* \* \* \*